United States Patent [19]

Kratzmann et al.

[11] 4,043,731
[45] Aug. 23, 1977

[54] CALENDER WITH NIP BOUNDARY PLATES

[75] Inventors: Helmut Kratzmann, Altotting; Josef Heinik, Burgkirchen, Alz; Robert Obermaier, Burgkirchen, Alz; Erich Zentner, Burgkirchen, Alz; Robert Redinger, Altotting, all of Germany

[73] Assignee: Hoechst Aktiengesellschaft, Frankfurt am Main, Germany

[21] Appl. No.: 742,138

[22] Filed: Nov. 16, 1976

[30] Foreign Application Priority Data

Nov. 20, 1975 Germany .............................. 2552034

[51] Int. Cl.² .............................................. B29D 7/14
[52] U.S. Cl. ...................................... 425/366; 425/223;
425/224; 425/337; 425/447; 425/DIG. 235
[58] Field of Search ............... 425/224, 223, 363, 366, 425/371, DIG. 235, 447, 448, 337

[56] References Cited

U.S. PATENT DOCUMENTS

| 2,625,709 | 1/1953  | Schaiver ........................... 425/363 X |
| 2,960,044 | 11/1960 | Anetsberger ..................... 425/363 X |
| 3,570,054 | 3/1971  | Seanor et al. ........................ 425/337 |
| 3,740,177 | 6/1973  | Hoyt et al. ........................ 425/224 X |
| 3,754,849 | 8/1973  | Fox ..................................... 425/363 |
| 3,985,488 | 10/1976 | Hoffmann ........................... 425/363 |

*Primary Examiner*—Robert L. Spicer, Jr.
*Attorney, Agent, or Firm*—Connolly and Hutz

[57] ABSTRACT

In a calender the nip between a pair of rollers, of which one is obliquely adjustable, is bounded at the sides by plates adapted to the geometrical shape of the nip region and provided with slots, into which a control beam, parallel to the obliquely adjustable roller, engages, the ends of the beam are joined to the bearings of this roller, and the plates are arranged on supporting plates so as to be displaceble by means of a guide device, so that the plates, on oblique adjustment of the roller, are moved along a path which is concentric with the surface of the roller which is not obliquely adjustable.

1 Claim, 3 Drawing Figures

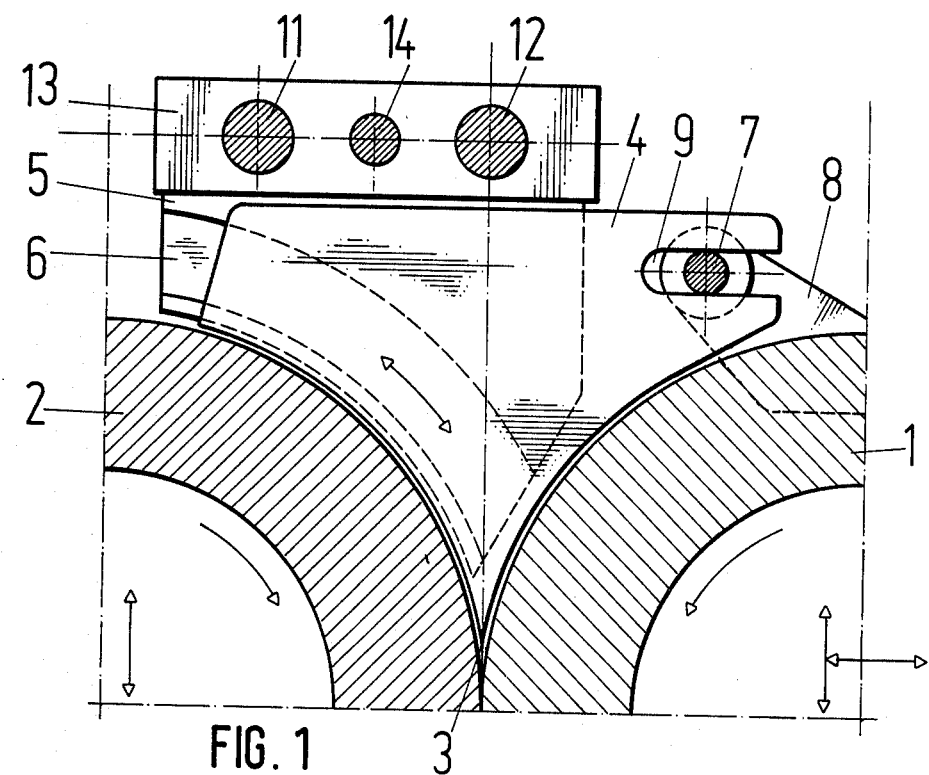
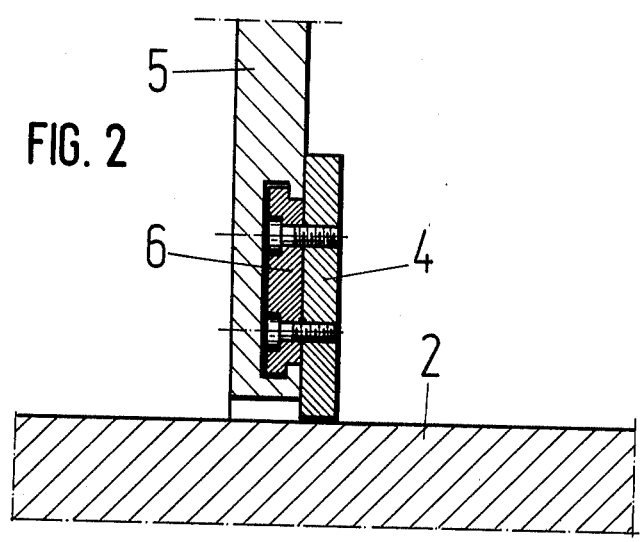

CALENDER WITH NIP BOUNDARY PLATES

The invention relates to a calender with nip-forming rollers in which the nip between a pair of rollers, one roller of which is obliquely adjustable, is bounded at the side by plates adapted to the geometrical shape of the nip region.

It is known that for the manufacture of sheets in a calender the nip of a pair of rollers is bounded at the sides by limiting jaws (plates) in order to prevent the material accumulating (kneaded material) in front of the nip from running off at the sides (see the article by G. Dost concerning "Herstellung kalandrierter PVC-Folien" (the manufacture of calendered PVC sheets) in the periodical "Der Plastverarbeiter" 1962, book 6, pages 268 to 274, in particular page 269). However, although these plates are so designed that they can be pushed as close as possible alongside the two rollers forming the nip, a considerable amount of the material accumulated can escape to the outside. The distance between rollers and plates must be relatively large to avoid contact during calendering between roller(s) and plates, which might result in damage to the ground roller surface, in the case of a possible adjustment of one or both rollers, for example, an oblique adjustment (roll crossing).

Therefore, due to their relatively large distance from the rollers which is necessary for safety reasons the known plates do not provide adequate lateral confinement of the accumulating material. In addition, in the case of the above-mentioned oblique adjustment, the set spacing is under certain circumstances made even larger; the oblique adjustment is, however, a measure which is frequently necessary during sheet calendering.

Accordingly, the problem of the invention is to create a calender with boundary plates for the material accumulating in the nip of a pair of rollers, of which one is obliquely adjustable, which plates can be arranged at a very small distance from the two rollers without the risk of damage to the rollers during calendering, and for which the set narrow distance between rollers and plates is not varied, even on oblique adjustment of one roller.

This problem is solved by a calender with rollers forming nips in which the nip between a pair of rollers, of which one is obliquely adjustable, is bounded at the sides by plates adapted to the geometrical shape of the nip region, comprising boundary plates provided with slots, a control beam parallel to the obliquely adjustable roller, which beam engages into said slots and the ends of which join to the bearings of the obliquely adjustable roller, supporting plates on which the boundary plates are displaceably mounted by means of a guide device so that the plates on oblique adjustment of the adjustable roller are moved along a path which is concentric with the surface of the roller which is not obliquely adjustable.

By means of the calender according to the invention an originally narrow-set spacing between the pair of rollers and the plates is retained even when one roller of the roller pair is obliquely adjusted. Consequently, even in the case of very narrow adjustments of the plates damage to the rollers is precluded due to the fact that a contact between rollers and plates is not possible. By means of the small spacing from the rollers rendered possible by the arrangement of the plates in accordance with the invention, escape at the sides of the accumulated material is substantially prevented.

The invention is explained in detail by way of the example of construction shown in the drawing, without being limited to this embodiment.

FIG. 1 shows the illustrative embodiment in cross-section,

FIG. 2 shows in detail the displaceable arrangement of the plate 4 on the supporting plate 5 of FIG. 1.

Figure 3:
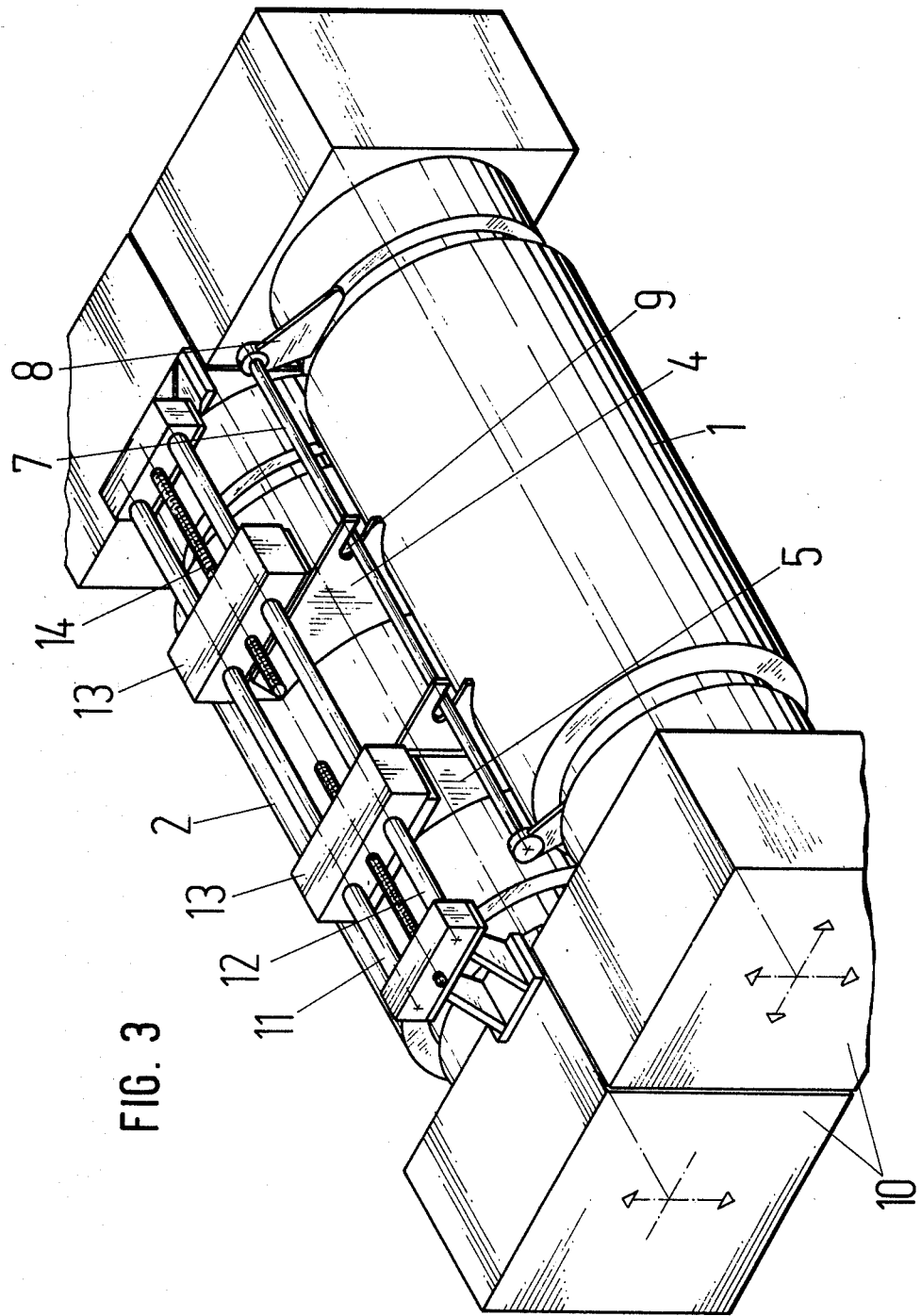
FIG. 3 shows the embodiment of FIG. 1 in perspective view.

The rollers 1,2, which form the roller nip 3, are the two inlet rollers of an sheet-calender (not illustrated). As is customary in such calenders, the roller 1 is horizontally and obliquely adjustable whilst the roller 2 is vertically adjustable (these possibilities of adjustment are indicated in FIG. 1 by the arrows). The side end of the roller nip 3 is bounded by the plates 4. The plates 4 are so designed that they can be pushed very close alongside the two rollers 1 and 2. They are displaceably arranged on the supporting plates 5, which are advantageously likewise substantially adapted to the geometrical shape of the nip region. The plates 4 are joined by way of the control beam 7 to the bearing members 10 of the obliquely-adjustable roller 1 by means of supports 8, in which the control beam is clamped. In addition, the plates 4 have, at the upper edge of each side that faces the roller 1, a slot 9, in which the control beam 7 is mounted parallel to the roller 1. The slots 9 in the plates 4 are advantageously open to the outside, thereby facilitating the introduction of the control beam 7 into the slots 9. The control beam 7 is a metal rod of round cross-section. Its ends may alternatively be joined directly to the bearing members 10 of the obliquely adjustable roller 1, that is to say without the use of supports 8. On oblique adjustment of the roller 1, the adjusting force is transmitted by way of the control beam 7 to the two plates 4. The plates 4 are movably attached to a supporting plate 5 each in such a manner that they are moved on a line which is concentric with the surface of the roller 2 when the roller 1 is obliquely adjusted. On oblique adjustment of the roller 1, the measure of the adjustment is proportionally transmitted to the plates 4 by way of the control beam 7. The plates 4 are moved by means of the guide device 6 along a path which is concentric with the surface of the roller 2. During this movement the control beam 7 inevitably changes its position in the slots 9 to some extent. The guide device 6 consists of the T-shaped guide, attached to the plate 4 by means of screws, and the corresponding groove-slide path in the supporting plate 5 extending concentrically with the surface of the roller 2 (cf. FIG. 2). The guide device may likewise consist of a dovetail or roller guide fitted on the plates 4, and a corresponding slide path in the supporting plates 5. The slide path in the supporting plate 5 has therefore to ensure that the plate 4 can move on a line concentric with the surface of the roller 2. The shape of the slide path in the supporting plate 5 shown in accordance with FIG. 2 is not the only arrangement that comes into consideration for this purpose. It is also possible to provide two or three slide paths for which the plate 4 has corresponding guides, provided that the previously mentioned condition for the slide path is met. The two supporting plates 5 and thus also the plates 4 are attached, so that they are longitudinally displaceable by means of the guide blocks 13, to the guide beams 11, 12, which are mounted at the roller bearing members 10;

the longitudinal adjustment is effected with the threaded shaft 14. The two plates 4 with their supporting plates 5 are therefore displaceable parallel to the rollers 1 and 2, and their spacing with respect to each other can be varied as desired.

The plates 4 and the supporting plates 5 consist preferably of metal, particularly of stainless steel.

What is claimed is:

1. A calender with rollers forming nips in which the nip between a pair of rollers, of which one is obliquely adjustable, is bounded at the sides by plates adapted to the geometrical shape of the nip region, comprising boundary plates provided with slots, a control beam parallel to the obliquely adjustable roller, which beam engages into said slots and the ends of which join to the bearings of the obliquely adjustable roller, supporting plates on which the boundary plates are displaceably mounted by means of a guide device so that the plates on oblique adjustment of the adjustable roller are moved along a path which is concentric with the surface of the roller which is not obliquely adjustable.

* * * * *